(12) United States Patent
Tseng

(10) Patent No.: US 8,782,648 B2
(45) Date of Patent: Jul. 15, 2014

(54) INFORMATION PROCESSING SYSTEM AND RELATED METHOD THEREOF

(75) Inventor: Yi-Hsien Tseng, Taipei County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1305 days.

(21) Appl. No.: 12/208,317

(22) Filed: Sep. 10, 2008

(65) Prior Publication Data

US 2009/0106759 A1      Apr. 23, 2009

(30) Foreign Application Priority Data

Oct. 19, 2007    (TW) ................................ 96139280 A

(51) Int. Cl.
| | | |
|---|---|---|
| *G06F 9/46* | (2006.01) | |
| *G06F 9/48* | (2006.01) | |
| *H04N 5/44* | (2011.01) | |
| *H04N 5/14* | (2006.01) | |

(52) U.S. Cl.
CPC ............ *G06F 9/4806* (2013.01); *H04N 5/4401* (2013.01); *H04N 5/14* (2013.01)
USPC ............................ 718/102; 348/571; 348/725

(58) Field of Classification Search
CPC ..... G06F 9/466; H04N 5/8205; H04N 5/9205
USPC .................................. 718/102; 348/571, 725
See application file for complete search history.

(56) References Cited

U.S. PATENT DOCUMENTS

| | | | |
|---|---|---|---|
| 6,243,735 B1 | 6/2001 | Imanishi | |
| 6,430,594 B1* | 8/2002 | Akiyama et al. | 718/108 |
| 6,668,326 B1* | 12/2003 | Sella et al. | 726/6 |
| 6,807,595 B2 | 10/2004 | Khan | |
| 7,373,445 B2* | 5/2008 | Hellwig et al. | 710/112 |
| 2002/0116437 A1* | 8/2002 | Kambara et al. | 709/102 |
| 2003/0236814 A1* | 12/2003 | Miyasaka et al. | 709/102 |
| 2006/0095911 A1* | 5/2006 | Uemura et al. | 718/100 |
| 2009/0150891 A1* | 6/2009 | Matsa et al. | 718/103 |

FOREIGN PATENT DOCUMENTS

| | | |
|---|---|---|
| CN | 1210306 A | 3/1999 |
| CN | 1534474 A | 10/2004 |
| JP | P2007200112 A | 8/2007 |
| TW | 318912 | 11/1997 |
| TW | I265455 | 11/2006 |
| TW | 200723061 | 6/2007 |

* cited by examiner

*Primary Examiner* — Camquy Truong
(74) *Attorney, Agent, or Firm* — Winston Hsu; Scott Margo

(57) ABSTRACT

An information processing system includes a first electronic device, a second electronic device and a processing module. The first electronic device processes a first task. The second electronic device processes a second task. The processing module, controls, without utilizing an operating system, the second electronic device to process the second task for a first specific time period during which the first electronic device does not process the first task which was being processed before the first specific time period.

2 Claims, 8 Drawing Sheets

| Main state | Substate |
|---|---|
| Install Guide | Initial/Idle/None/Exit |
| Channel Change | Initial/ShowInfo/Display/WaitKey/IplateFading/Exit |
| DTV Scan Channel | Initial/NextChannel/SearchRFChannel/GetPrograms/ SavePrograms/Pause/End/Standby/MainMenu/INT |
| ATV Scan Channel | Initial/Wait/howInfo/Pause/End/Standby/MainMenu |
| Idle | Initial/Idle//Exit |
| OSD Main Menu | Initial/Idle/EPGTimer/CleanUp/Standby/Scan/EPG/ Exit/ChannelChange/USB |
| Standby | Initial/Idle/Exit |
| TTX | Initial/Idle/None/Exit |
| MHEG | Initial/Idle/Menu/ChannelChange/None/Exit |
| EPG | Initial/Idle/Swicth Event/Program/Page/Time/ServiceType/Favorite Date/Info/ChannelChange/Exit/Standby/Redrew/Timer |
| CI MMI | None/ENQ/MENU/LIST/REINIT/CloseMMI/ |
| Subtitle | Initial/Decode PMT/PES/PES_Initial/PES_Read/ PES_Exit Exit/ErrorRecovery |
| USB Download | Initial/Copy/Cancel |
| Show Banner | Initial/Display |

FIG. 8

INFORMATION PROCESSING SYSTEM AND RELATED METHOD THEREOF

BACKGROUND OF THE INVENTION

1. Field of the Invention

The present invention relates to an information processing system, and particularly relates to an information processing system utilizing no operating system.

2. Description of the Prior Art

Conventionally, a TV system utilizes an operating system (OS) to process tasks via a joint processing method. The joint processing method can be described as follows. Assuming there are three tasks A, B, C, then task A is divided into $A_1, A_2, A_3$, B is divided into $B_1, B_2, B_3$, and C is divided into $C_1, C_2, C_3$. $A_1$ is first processed, then is $B_1$ and the next one is $C_1 \ldots$ and so on, until the tasks A, B and C are processed.

Since the operating system utilizes the joint processing method to process various tasks, a large amount of data accessing and processing operations will be generated. Thus, related problems and the instability of the system may occur. Also, in order to match the operating system of a TV system, the firmware or codes for the TV system should be designed specifically for the TV system, thus also increasing the design complexity of the system. Besides, a more powerful processing unit is needed to perform the complete operating system function, again increasing the cost of the system.

SUMMARY OF THE INVENTION

Therefore, one objective of the present invention is to provide an information processing system and related methods thereof, to utilize no operating system to control a plurality of electronic devices to operate following orders.

One embodiment of the present invention discloses a information processing system including a first electronic device, a second electronic device and a processing module. The first electronic device processes a first task. The second electronic device processes a second task. The processing module, controls, without utilizing an operating system, the second electronic device to process the second task for a first specific time period during which the first electronic device does not process the first task which was being processed before the first specific time period.

Another embodiment of the present invention discloses a information processing system, which comprises a first electronic device, a second electronic device, a third electronic device, and a processing module. The first electronic device serves to process a first task. The second electronic device serves to process a second task. The third electronic device serves to process a third task, wherein the first, the second, and the third electronic devices do not process the first, the second and the third tasks simultaneously, and the first, the second, and the third electronic devices have different priorities. The processing module controls, without utilizing an operating system, the second electronic device to process the second task, or controls the third electronic device to process the third task according to the priorities for a specific time period during which the first electronic device does not process the first task which was being processed before the specific time period.

Another embodiment of the present invention discloses an information processing method which is performed under a circumstance where no operating system is utilized. The method includes: (a) process a first task; (b) process a second task, wherein the first and the second tasks are not processed simultaneously; and (c) process the second task for a first specific time period during which the first task is not processed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a schematic diagram illustrating an example of the TV system 600 according to the present invention.

DETAILED DESCRIPTION

Figure 1:
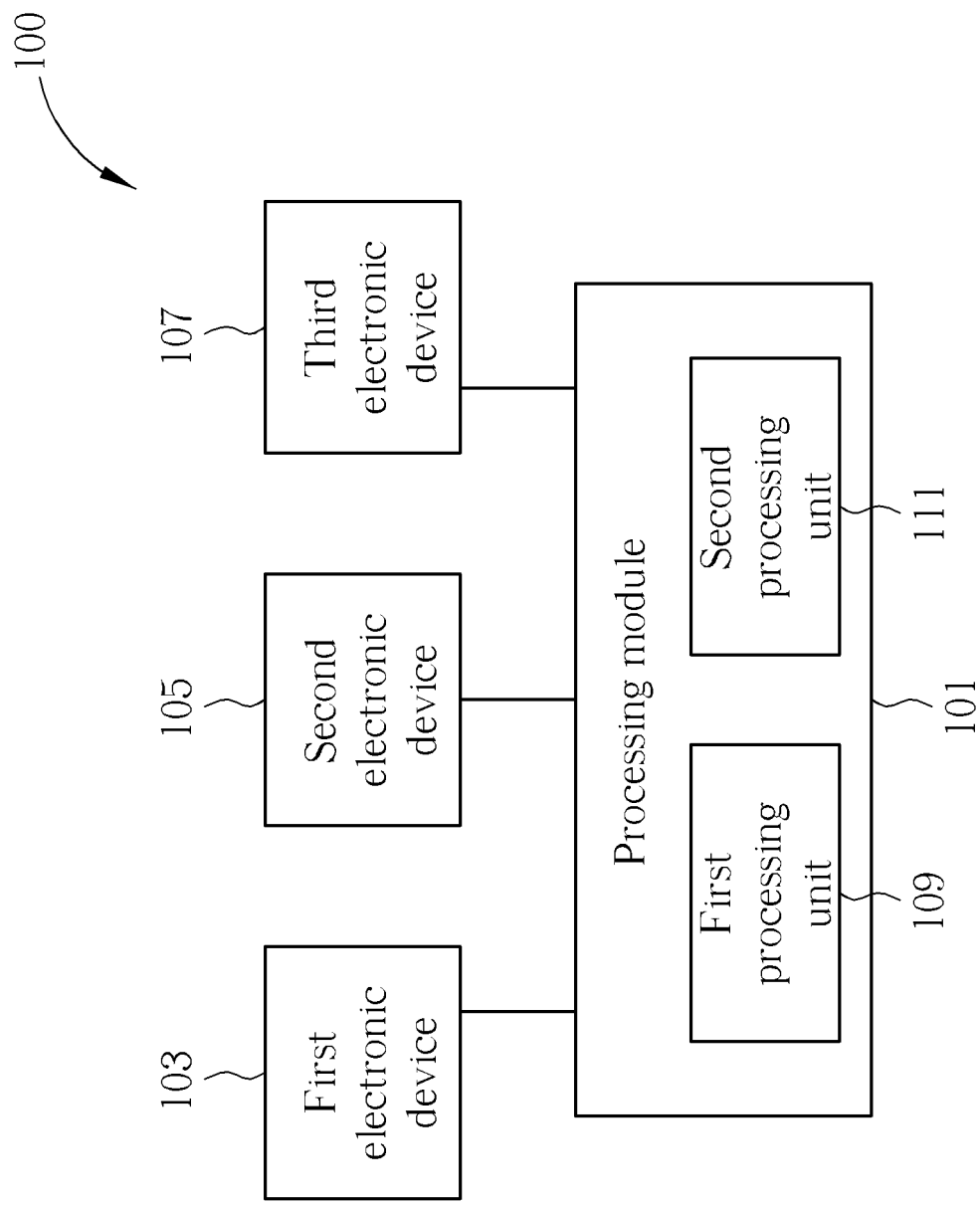
FIG. 1 is a block diagram illustrating an information processing system according to an embodiment of the present invention.

FIG. 1 is a block diagram illustrating an information processing system 100 according to an embodiment of the present invention. As shown in FIG. 1, the information processing system 100 comprises a processing module 101, a first electronic device 103, a second electronic device 105 and a third electronic device 107. The first electronic device 103, the second electronic device 105 and the third electronic device 107 are utilized for performing a first task, a second task and a third task, respectively, and do not process their respective tasks simultaneously. Also, the processing module 101 controls the first, the second and the third electronic device 103, 105 and 107 without utilizing an operating system (OS).

Figure 2:
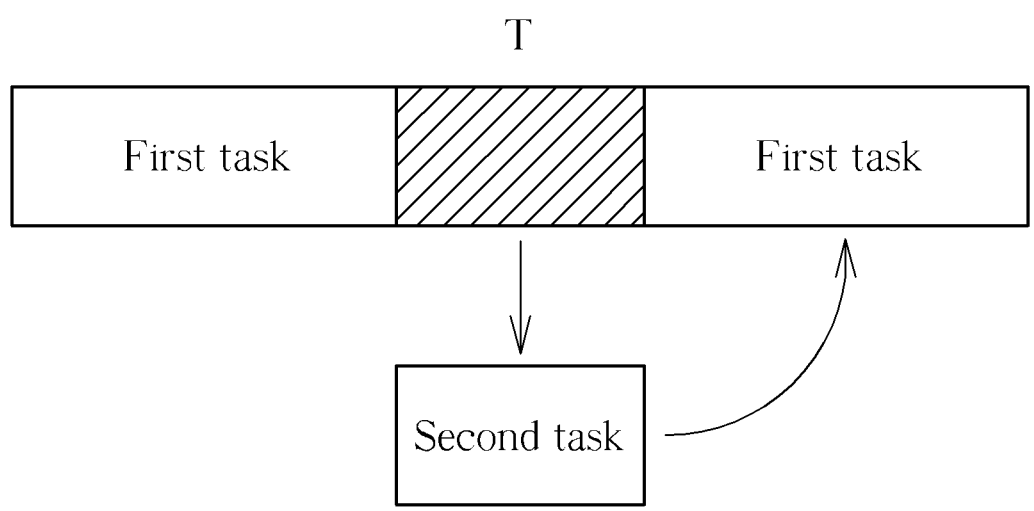
FIG. 2 and FIG. 3 illustrate the operation of the information processing system according to the embodiments of the present invention.
Figure 3:
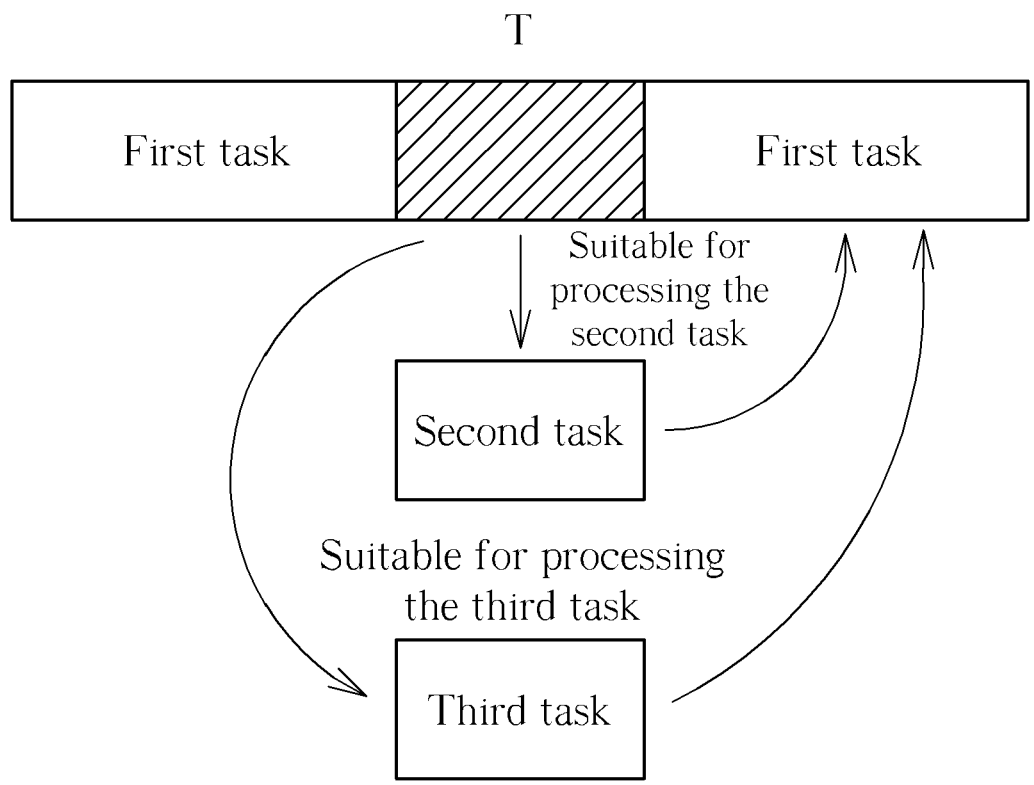

FIG. 2 and FIG. 3 illustrate the operation of the information processing system according to the embodiments of the present invention. Please jointly refer to FIG. 1, FIG. 2 and FIG. 3 to understand the characteristics of the present invention more clearly. FIG. 2 illustrates the operation of the information processing system according to the present invention when the third electronic device is inactive. As shown in FIG. 2, the first electronic device 103 does not process the first task in a predetermined time T; T can be a delay time for awaiting a command or data, the necessary waiting time of the first electronic device 103, or other similar time period. In this case, the processing module 101 will control the second electronic device 105 to process the second task in the specific time period T. Also, after the specific time period T, when the first electronic device 103 still needs to perform the first task, the processing module 101 controls the second electronic device 105 to stop processing the second task and controls the first electronic device 103 to continue processing the first task. Alternatively, when the first electronic device 103 does not need to process the first task after the specific time period T, the processing module 101 will control the second electronic device 105 to continue processing the second task. In this embodiment, the concept of a state machine can be applied; that is, give the first electronic device 103 and second electronic device 105 a state parameter, and the first electronic device 103 and second electronic device 105 will perform different operations according to the state parameter. In other words, the first electronic device 103 performs different processing on the first task according to different state parameters. Since the concept of a state machine is well known by persons skilled in the art, it is omitted herein for brevity.

FIG. 3 illustrates a situation where the third electronic device is active. As shown in FIG. 3, the processing module 101 determines, without utilizing the operating system, which one of the second and the third task should be processed for the specific time period when the first electronic device 103 does not process the first task for the specific time period T. When the second task is suitable for processing, then the processing module 101 controls the second electronic device 105 to process the second task for the specific time period T. Also, after the specific time period T, when the first electronic device 103 still needs to process the first task, the processing module 101 controls the second electronic device 105 to stop processing the second task and controls the first electronic device 103 to continue processing the first task. Similarly, when the third task is suitable for processing for the specific time period T, then the processing module 101 controls the third electronic device 107 to process the third task for the specific time period T. Also, after the specific time period T, when the first electronic device 103 still needs to process the first task, the processing module 101 controls the third electronic device 107 to stop processing the third task and controls the first electronic device 103 to continue processing the first task. According to the same rules, when the second electronic device processes the second task and must stop processing the second task in a second specific time period, the processing module 101 determines which one of the first and the third task should be processed for the second specific time period. Additionally, after the first task is completed, the processing module 101 will determine which one of the second task and the third task is suitable for processing.

One method to determine which one of the first, second and third tasks is suitable for processing is to give priorities to the first, second and third electronic devices 103, 105 and 107, and determine which task should be processed first according to the priorities. In this embodiment, the first electronic device 103 has priority over the second electronic device 105, and the second electronic device 105 has a higher prior than the third electronic device 107. Therefore, the controlling module 101 first controls the first electronic device 103 to process the first task, and controls the second electronic device 105 to process the second task for the specific time period T when the first electronic device 103 does not processing the first task for the specific time period T. Also, when the second electronic device 105 cannot process the second task in the specific time period, the controlling module 101 controls the third electronic device 107 to process the third task. Similarly, when the second electronic device 105 processes the second task but must stop processing the second task in a specific time period, the controlling module 101 will first determine if there is a first task that needs to be processed; if so, process the first task, and process the third task only if no first tasks need to be processed. Briefly, the concept of "processing a task, and determining which task is suitable for processing in the stopped time in which the original task cannot be processed" is not limited to the above-mentioned embodiments, and such a concept can also be realized in other embodiments, which also fall in the scope of the present invention.

One reference to determining the priorities can be the importance of the tasks: the more important the task, the higher priority is given. This is not meant to limit the scope of the present invention: methods other than priorities can also be utilized to determine which task should be processed first (e.g., the amount of data required in the tasks), and such variations should also fall within the scope of the present invention.

Additionally, the processing module 101 can be implemented by a single processing unit as in prior art, but also can be implemented by a first processing unit 109 and a second processing unit 111, as shown in FIG. 1. When a single processing unit is utilized, since the processing unit should suffer all controlling burden, a powerful processing unit is needed, thereby increasing the cost. When two processing units are utilized, the overall function can be controlled by the processing units. For example, in the embodiment shown in FIG. 1, the first processing unit 109 can be in charge of the state parameter setting or priorities setting, and the second processing unit 111 can control the operation of each electronic device. In this way, two normal processing units can be utilized, the cost of which will be lower than a single powerful processing unit. It should be noted that the number of the processing units utilized by the processing module 101 according to the embodiment of the present invention is not limited to two; more than two processing units also can be utilized.

Figure 4:
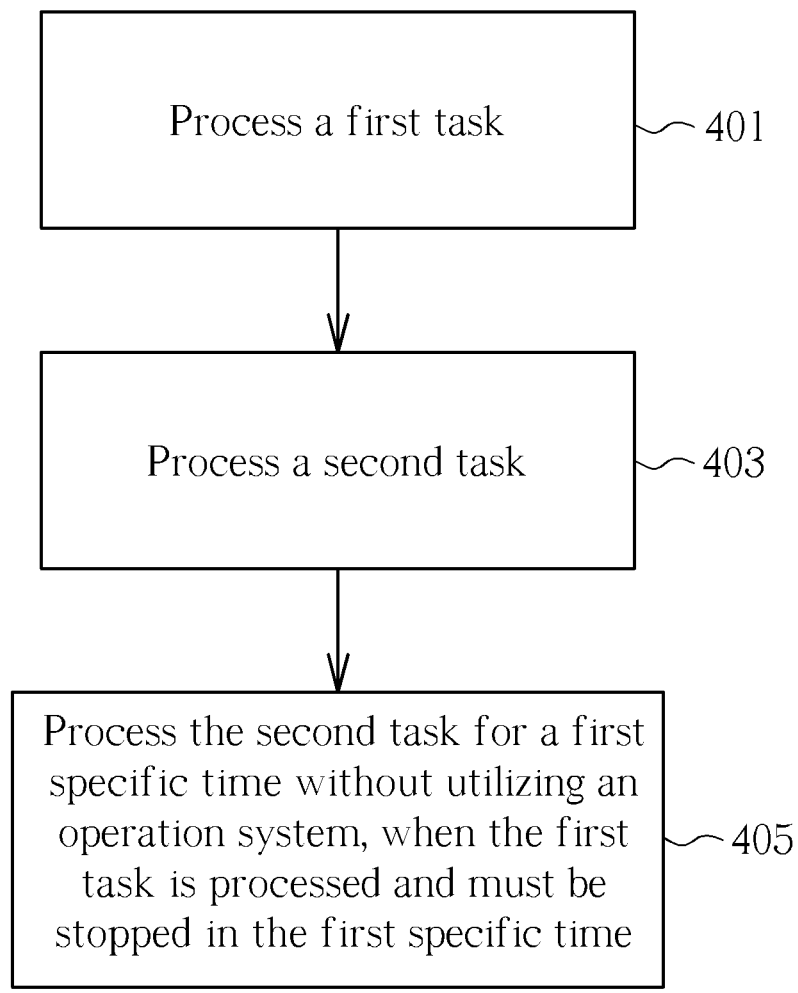
FIG. 4 and FIG. 5 illustrate the information processing methods corresponding to the information processing system 100 shown in FIG. 1.
Figure 5:
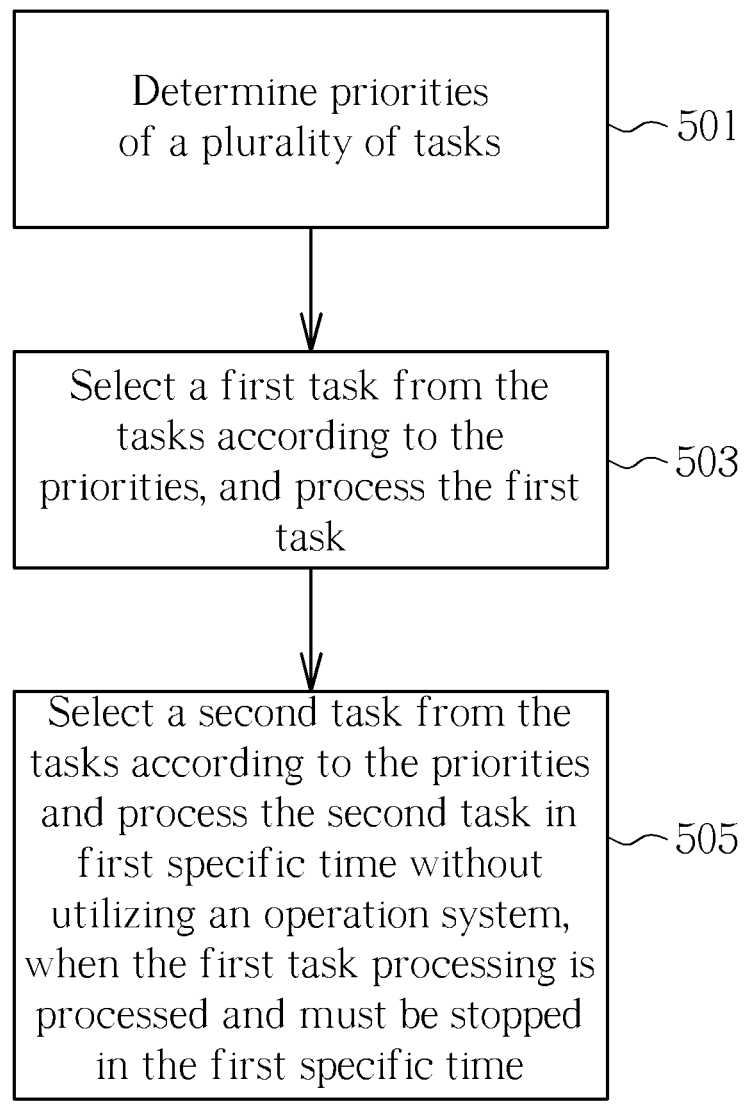

FIG. 4 and FIG. 5 illustrate the information processing methods corresponding to the information processing system 100 shown in FIG. 1. FIG. 4 illustrates steps for when only two electronic devices are active, and FIG. 5 illustrates steps for when more than two electronic devices are operating.

The method shown in FIG. 4 includes:

Step 401

Process a first task;

Step 403

Process a second task, wherein the first and the second tasks are not processed simultaneously.

Step 405

Process the second task for a first specific time period without utilizing an operating system, when the first task is being processed and must be stopped in the first specific time period.

The method shown in FIG. 5 includes:

Step 501:

Determine priorities of a plurality of tasks.

Step 503:

Select a first task from the tasks according to the priorities, and process the first task.

Step 505

Select, without utilizing an operating system, a second task from the tasks according to the priorities and process the second task in a first specific time period when the first task is being processed and must be stopped in the first specific time period or when the first task is completed.

Figure 6:
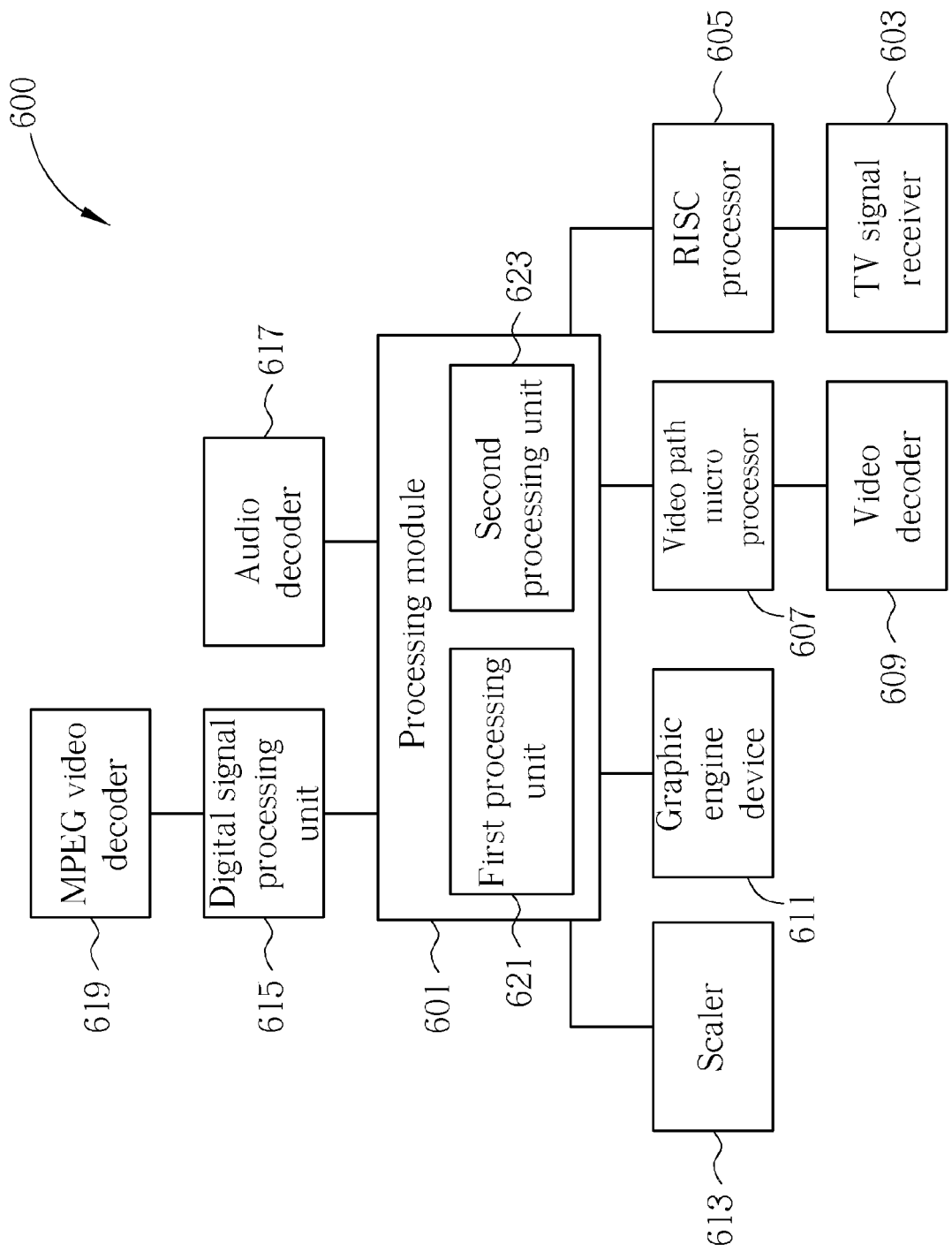
FIG. 6 illustrates the information processing system according to the embodiments of the present invention as applied to a TV system 600.

FIG. 6 illustrates the information processing system according to the embodiments of the present invention as applied to a TV system 600. As shown in FIG. 6, the TV system 600 includes a processing module 601 for controlling electronic devices of the TV system 600, such as a TV signal receiver 603, a RISC (Reduce Instruction Set Computer) processor 605, a video path micro processor 607, a video decoder 609, a graphic engine device 611, a scaler 613, a digital signal processing unit 615, an audio decoder 617, and a MPEG video decoder 619. Since the structures and operations of these devices are well-known by persons skilled in the art, they are omitted for brevity here. Also, the operation of the TV system 600 can be designed to have the characteristics as shown in FIG. 1 to FIG. 5: priorities are given to related electronic devices; an electronic device (e.g., a TV signal receiver) with a high priority is controlled to process related tasks; the processing module 601 determines which one of the other electronic devices has second highest priority (e.g., the video decoder) when the electronic device with highest priority (TV signal receiver) must stop processing the task thereof in a specific time period. Also, controls the electronic device (video decoder) to perform the task thereof in the specific time period. Other technique characteristics are already illustrated in the above-mentioned description, and thus are omitted for brevity. Also, another determination method to determine priorities is by giving high priorities to the electronic device having tasks that are important and cannot be interrupted. For example, the TV signal receiver is used for receiving the TV signal and cannot be interrupted, so a higher priority is given to the TV signal receiver. On the other hand, if the graphic engine device is utilized for illustrating pictures such as a program menu, it can be given low priority since it can suffer more latency. In this embodiment, the first processing unit 621 is an 8-bit processor, and the second processing unit 623 is a 32-bit processor. The second processing unit 623 is used for processing complex actions; the first processing unit 621 is used for processing simple actions such as setting state parameters or priorities, but it is not meant to limit the scope of the present invention.

Figure 7:
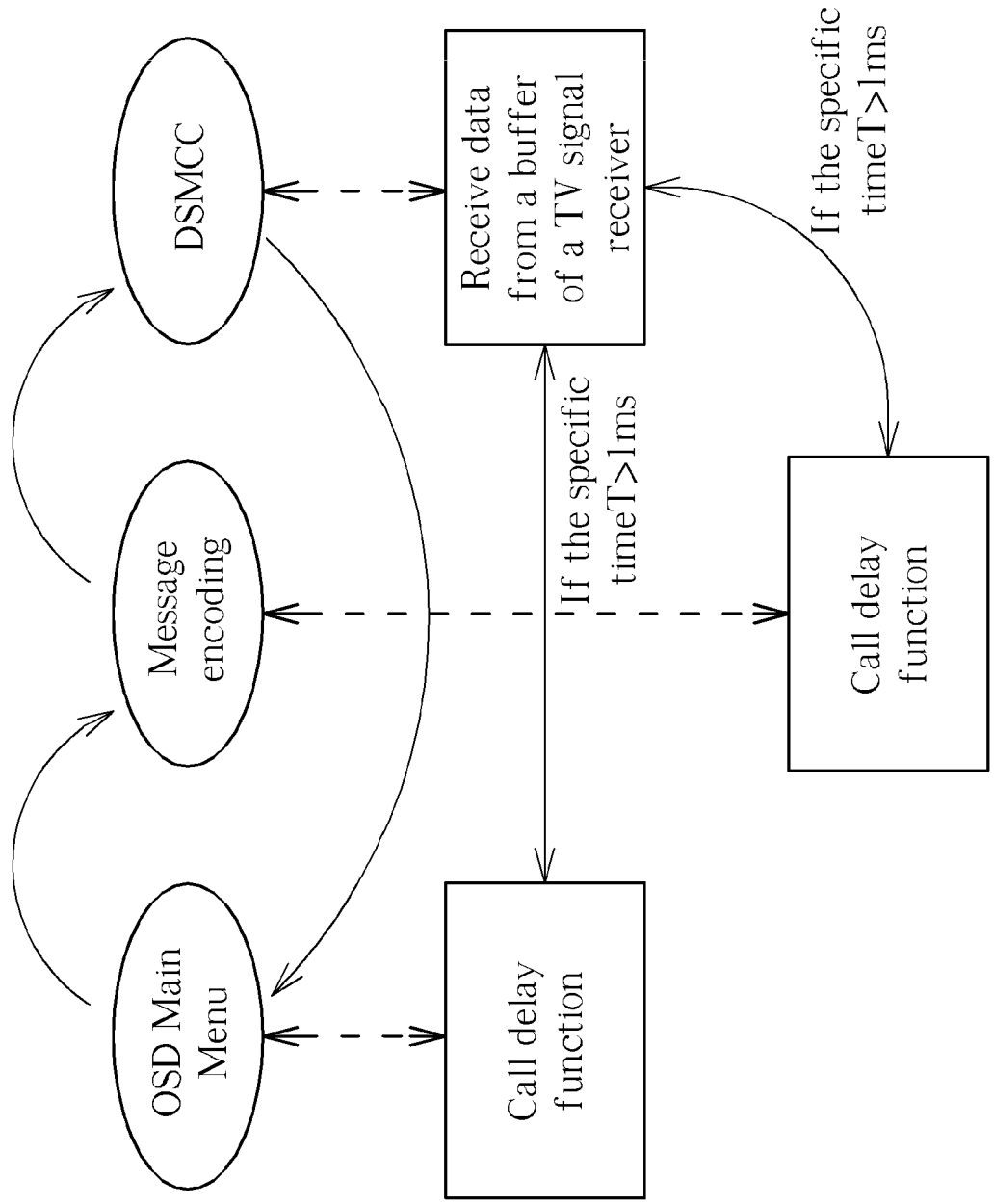
FIG. 7 illustrates the operation of the TV system 600 according to the present invention.

FIG. 7 illustrates the operation of TV system 600 according to the present invention. As presented in FIG. 7, three tasks are shown: OSD Main Menu, message encoding, and Digital Storage Medium Command and Control (DSMCC). In this case, the message encoding follows the Multimedia and Hypermedia information coding Expert Group (MHEG) standard. The three tasks can be switched to each other, and a call delay function can be called to process other tasks if a task with higher priority must stop processing for a specific time period (in this case, the delay time). Also, the task with higher priority can continue being processed after the specific time period. In this embodiment, when the delay time is large than 1 ms, the call delay function is called; otherwise, the call delay function will not be called at all, but this is not meant to limit the scope of the present invention. It should be noted that a task is not limited to be processed by an electronic device, but also can be processed by a plurality of electronic devices. In addition, when a task processed by a first group of electronic devices has higher priorities than a task processed by a second group, then the priorities of the first group of the electronic devices are higher than the second group of the electronic devices. Additionally, even the electronic devices in the same group will have different priorities.

FIG. 8 is a schematic diagram illustrating an example of the TV system 600 according to the present invention. As shown in FIG. 8, the task can be classified into main states and sub states, and the main state can include a plurality of sub states. For example, the OSD Main Menu can include sub states including Initial/Idle/EPGtimer/Clean Up/Standby/Scan/EPG/Exit/ChannelChange/USB. In this case, the electronic devices of the same group can be jointly responsible of a main state and respectively process related sub-states.

Those skilled in the art will readily observe that numerous modifications and alterations of the device and method may be made while retaining the teachings of the invention.

What is claimed is:

1. An information processing system, comprising:
a processor;
a first electronic device, for processing a first task; a second electronic device, for processing a second task; and
a processing module, for controlling, without utilizing an operating system, the second electronic device to process the second task for a first specific time period during which the first electronic device is forced to stop processing the first task which was being processed before the first specific time period, without receiving any stopping command;
a third electronic device, for processing a third task, wherein the first, the second and the third electronic devices do not process the first, the second and the third tasks simultaneously;
wherein the processing module determines, without utilizing the operating system, which one of the first and the third tasks should be processed in the second specific time period during which the second electronic device does not processes the second task which was being processed before the second specific time period;
wherein priorities of the first, the second and the third electronic devices are set such that the first electronic device has priority over the second electronic device and the second electronic device has priority over the third electronic device, where the processing module first determines if the first task is suitable for processing in the second specific time period;
wherein the first task is a signal receiving task and the second task is a picture illustrating task, where the first task has a higher priority than the second task.

2. An information processing method which is performed under a circumstance where no operating system is utilized, comprising:
processing a first task via a first electronic device before a first specific time period, wherein processing for the first task is forced to be stopped during the first specific time period without receiving any stopping command;
processing a second task via a second electronic device during the first specific time period and before a second specific time period, wherein processing for the second task is forced to be stopped during the second specific time period without receiving any stopping command;
processing a third task via a third electronic device, wherein the first, the second and the third tasks are not processed simultaneously;
setting priorities of the first, the second and the third electronic devices are set such that the first electronic device has priority over the second electronic device and the second electronic device has priority over the third electronic device; and
determining which one of the first and the third tasks should be processed in the second specific time period, where the first task is first determined to check if the first task is suitable for processing in the second specific time period;
wherein the first task is a signal receiving task and the second task is a picture illustrating task, wherein the first task has a higher priority than the second task.

* * * * *